United States Patent [19]

Gill

[11] Patent Number: 4,925,096
[45] Date of Patent: May 15, 1990

[54] APPARATUS FOR DELIVERING A LIQUID

[75] Inventor: David C. Gill, Keynsham, United Kingdom

[73] Assignee: Nomix Manufacturing Company Limited, Bristol, United Kingdom

[21] Appl. No.: 404,009

[22] Filed: Sep. 5, 1989

Related U.S. Application Data

[63] Continuation of Ser. No. 287,861, Dec. 21, 1988, abandoned.

[30] Foreign Application Priority Data

Dec. 31, 1987 [GB] United Kingdom ............... 8730326
Sep. 16, 1988 [GB] United Kingdom ............... 8821719

[51] Int. Cl.⁵ .............................................. B05B 7/26
[52] U.S. Cl. ........................................ 239/10; 239/61; 239/74; 239/172
[58] Field of Search ................. 239/10, 61, 62, 71, 239/74, 160, 172; 73/3, 195-199, 290 R, 291

[56] References Cited

U.S. PATENT DOCUMENTS

| | | | |
|---|---|---|---|
| 1,924,144 | 8/1933 | Woodcock et al. | 239/71 |
| 2,531,650 | 11/1950 | Stagner | 239/375 |
| 2,767,581 | 10/1956 | Moorehead . | |
| 2,810,606 | 10/1957 | Taylor | 239/71 |
| 3,330,482 | 7/1967 | Crowe | 239/74 |
| 3,341,168 | 9/1967 | Toeppen . | |
| 3,452,931 | 7/1969 | Knowles | 239/224 |
| 3,455,507 | 7/1969 | Ryder et al. . | |
| 3,539,103 | 11/1970 | Marsh | 239/15 |
| 3,657,919 | 4/1972 | Brown . | |
| 3,939,688 | 2/1976 | Misch et al. . | |
| 3,970,121 | 7/1976 | Brandt . | |
| 4,073,304 | 2/1978 | Lerner et al. . | |
| 4,093,107 | 6/1978 | Allman et al. | 239/74 |
| 4,184,367 | 1/1980 | Jenney et al. . | |
| 4,220,996 | 9/1980 | Searcy . | |
| 4,285,041 | 8/1981 | Smith . | |
| 4,324,127 | 4/1982 | Gazzara et al. . | |
| 4,331,262 | 5/1982 | Snyder et al. . | |
| 4,362,275 | 12/1982 | Coffee . | |
| 4,392,611 | 7/1983 | Bachman et al. | 239/74 |
| 4,407,217 | 10/1983 | Jackson . | |
| 4,609,148 | 9/1986 | Gill . | |
| 4,660,607 | 4/1987 | Griffith et al. . | |
| 4,690,326 | 9/1987 | Gill . | |
| 4,714,196 | 12/1987 | McEachern et al. | 239/62 |
| 4,721,245 | 1/1988 | van Zweeden | 239/10 |
| 4,723,437 | 2/1988 | McKenzie . | |
| 4,735,225 | 4/1988 | Huveteau . | |

FOREIGN PATENT DOCUMENTS

| | | |
|---|---|---|
| 86030 | 8/1983 | European Pat. Off. . |
| 143588 | 6/1985 | European Pat. Off. . |
| 0201981A | 11/1986 | European Pat. Off. . |
| 2127651 | 12/1971 | Fed. Rep. of Germany . |
| 2266450 | 10/1975 | France . |
| 2405471 | 4/1979 | France . |
| WO83/01506 | 4/1983 | PCT Int'l Appl. . |
| 432873 | 9/1935 | United Kingdom . |

(List continued on next page.)

OTHER PUBLICATIONS

Tecnoma Publication, "Spinning Disc Sprayer for Low Volume Herbicide Applications,"
Nomix, "The Low Exposure . . . Sealed Application . . . High Work Rate System."
Nomix, "Weed Controller."

Primary Examiner—Andres Kashnikow
Assistant Examiner—Karen B. Merritt
Attorney, Agent, or Firm—Merchant, Gould, Smith, Edell, Welter & Schmidt

[57] ABSTRACT

A liquid such as a herbicide is delivered from spray nozzles (4) on a boom (2). The herbicide is supplied from a herbicide container (8) by a pump (18), and is diluted with water supplied from a tank (10) by a pump (12). The speed of the herbicide pump (18) is controlled by control means (22) and is responsive to the travel speed of the apparatus. The volumetric output of the pump (18) is calibrated by supplying the herbicide to a calibration vessel (32) during a test cycle in which the apparatus travels over a predetermined distance. Correction factors can then be input to the control means (22) in order to bring the volumetric output of the pump (18) into line with desired flow rates.

10 Claims, 3 Drawing Sheets

FOREIGN PATENT DOCUMENTS

| | | |
|---|---|---|
| 705396 | 3/1954 | United Kingdom . |
| 941258 | 11/1963 | United Kingdom . |
| 1046065 | 10/1966 | United Kingdom . |
| 2032627 | 5/1980 | United Kingdom . |
| 2048091A | 12/1980 | United Kingdom . |
| 2057283A | 4/1981 | United Kingdom . |
| 2059074 | 4/1981 | United Kingdom . |
| 2083438 | 3/1982 | United Kingdom . |
| 2113061 | 8/1983 | United Kingdom . |
| 2147483B | 5/1985 | United Kingdom . |
| 2151785A | 7/1985 | United Kingdom . |

APPARATUS FOR DELIVERING A LIQUID

This is a continuation of application Ser. No. 07/287,861, filed Dec. 21, 1988, now abandoned.

This invention relates to apparatus for delivering a liquid, and is particularly, although not exclusively, concerned with apparatus for delivering herbicides and pesticides, and other similar products, over the ground, or over crops.

Modern herbicides are highly effective, and consequently only very small quantities are required to achieve the desired result. These small dosages are achieved either by diluting the active ingredient, for example with water, or by applying the active ingredient, in a concentrated form, as droplets at low dose rates. Herbicides and similar products are often rather dangerous, and great care must be taken to avoid unnecessary contact with operators. A particularly hazardous operation is the mixing of the concentrated product with water. This operation is also subject to error, which can result in the application of a formulation of the wrong strength. These problems can be overcome by supplying the concentrated product and the diluent from separate containers on the apparatus, and mixing them continuously as they flow to delivery means for distributing the mixture over the ground. If the product is diluted in this manner or is applied at high concentration without dilution in the apparatus, the flow rate of the product from its container to the delivery means is very low. Where a pump is used to convey the product, variations in pump characteristics, for example as a result of wear, can significantly affect the flow rate of the product, so altering the dosage of the product which is applied to the ground. It is therefore necessary to adjust the pump to compensate for variations in its characteristics, and to compensate for other variations which may arise, for example variations in the consistency of the product which is being applied. To achieve this adjustment, it is necessary to have accurate knowledge of the actual flow rate of the product.

According to one aspect of the present invention, there is provided apparatus for delivering a liquid, the apparatus being adapted for travel over a surface to which the liquid is to be delivered, the apparatus comprising a source of liquid, a variable output reversible pump, delivery means to which the liquid is supplied by the pump from the source, control means for adjusting the output of the pump, and a travel speed sensor for transmitting a travel speed signal to the control means, a duct being provided for directing liquid from the pump to the lower region of a calibration vessel for determining the volumetric output of the pump, reversal of the pump causing liquid to be returned from the calibration vessel to the source.

The calibration vessel may be provided with a level detector, such as a float operated switch, for generating a signal when a predetermined volume of liquid has flowed into the vessel. This reduces dependence on the reading of the level using the graduations.

According to a second aspect of the present invention there is provided a method of calibrating apparatus for delivering a liquid, the method comprising directing a regulated flow of the liquid from a reversible pump to a calibration vessel for a predetermined time, determining the volume of liquid supplied to the calibration vessel during the predetermined time, comparing that volume of liquid with the volume of liquid corresponding to a desired flow rate, and adjusting the flow rate of liquid, if necessary, in order to approximate the actual volume of liquid received in the calibration vessel with the volume corresponding to the desired flow rate, and subsequently reversing the pump to draw the liquid from the calibration vessel.

According to a third aspect of the present invention there is provided a method of calibrating apparatus for delivering a liquid, the apparatus being adapted for travel over a surface to which the liquid is to be delivered and including a reversible pump the output of which is controlled in response to the travel speed of the apparatus, the method comprising directing flow from the pump to a calibration vessel while the apparatus travels over a predetermined distance, determining the volume of liquid supplied to the calibration vessel during such travel, comparing the volume of liquid with the volume of liquid corresponding to a desired flow rate, adjusting the control of the pump, if necessary, in order to approximate the actual volume of liquid with the volume corresponding to the derived flow rate, and subsequently reversing the pump to draw the liquid from the calibration vessel.

At the end of a test, the liquid in the calibration vessel is drawn out again by the pump and returned to the source. This source may be a sealed collapsible container, such as is disclosed in GB No. 2136321.

Where the liquid comprises concentrated product such as a herbicide or other agrochemical, it may be mixed with a second liquid, for example an additive or diluent (such as water) before being supplied to the delivery means. Thus, the apparatus may have a second liquid source, and a second pump for supplying the second liquid. The two flows then meet at a point downstream of the calibration vessel, and may be fed together to the delivery means, possibly passing through a contactor to ensure thorough mixing. In order to maintain the required proportions of the two liquids, there may be means for adjusting the flow rate of the second liquid. For example, there may be a variable restrictor at the outlet of the second pump, or the second pump itself may have an adjustable volumetric output.

In order to ensure that the calibration vessel gives a true reading of the corresponding flow rate during normal operation, measures need to be taken to ensure that the resistance to flow into the calibration vessel is generally the same as the resistance to flow towards the delivery means. In practice, this can be achieved by pressurising the calibration vessel during a test cycle to provide the same back pressure as occurs during normal operation. Alternatively, a restriction may be provided at the inlet of the calibration vessel.

The calibration vessel may be provided in line between the pump and the delivery means, the calibration vessel thus being full during normal operation of the apparatus. Alternatively, the calibration vessel may be branched off the line between the pump and the delivery means, a diverter valve being provided for directing flow selectively to the calibration vessel or the delivery means.

Where the delivery means comprises several spraying heads, separate calibration vessels may be provided for individual heads or groups of heads.

For a better understanding of the present invention, and to show how it may be carried into effect, reference will now be made, by way of example, to the accompanying drawings, in which.

Figure 1:
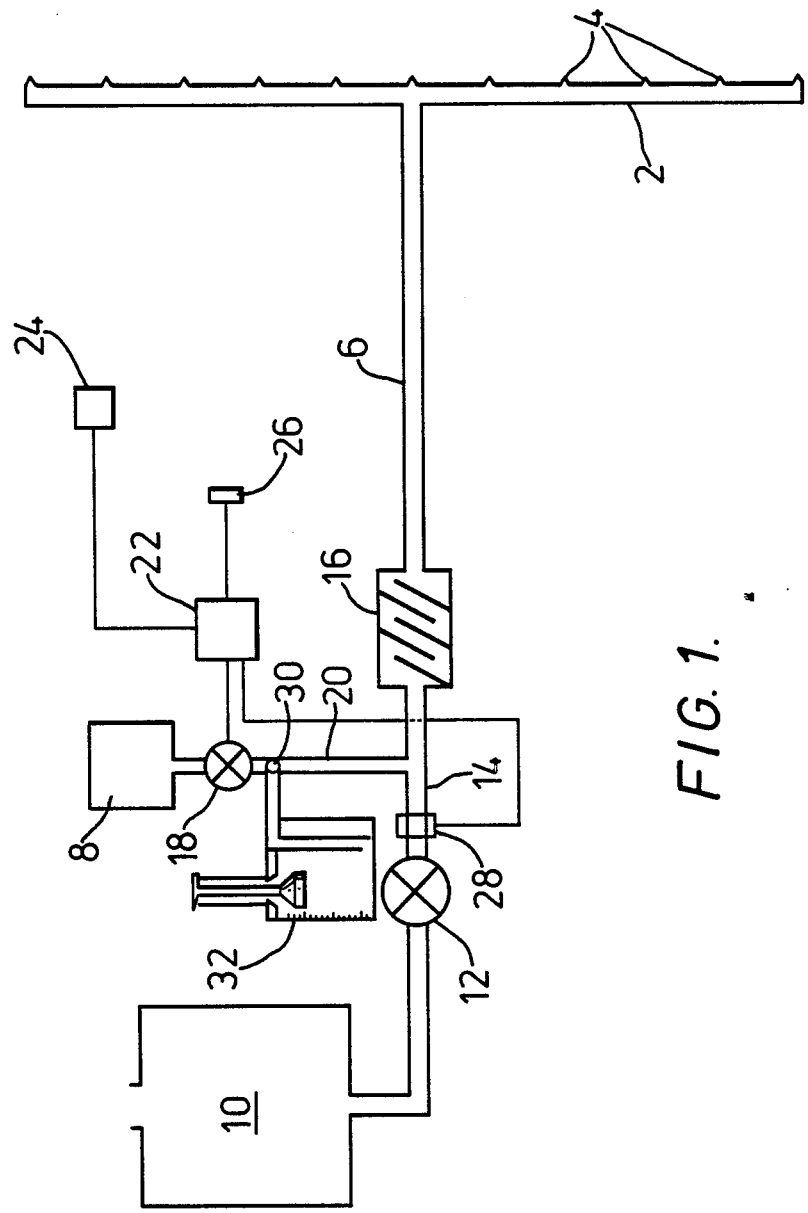
FIG. 1 is a diagrammatic view of apparatus for delivering a herbicide.

The apparatus shown in FIG. 1 comprises a spraying boom 2 having a row of spray nozzles 4. In use, a diluted herbicide is conveyed to the boom 2 along a line 6. The diluted mixture is obtained by mixing the concentrated product, drawn from a container 8, with water taken from a tank 10. The water is fed by a pump 12 along a line 14 to a contactor 16 containing baffles for ensuring thorough mixing of the water and the herbicide. The herbicide is fed from the container 8 by a pump 18 through a line 20 to the line 14.

The volumetric output of the pump 18 is adjustable. For example, the pump 18 may be a peristaltic pump which is operable at a variable speed to adjust the output. The output of the pump 18 is controlled by control means including an electronic control unit 22. The control unit 22 receives signals from a remote control device 24 and from a travel speed sensor 26. As well as controlling the pump 18, the control unit 22 also controls a variable restrictor 28 on the delivery side of the pump 12.

A diverter valve 30 is provided on the delivery side of the pump 18, and is operable to conduct herbicide from the container 8 either to the line 20 and then to the line 14, or to a calibration vessel 32.

Figure 2:
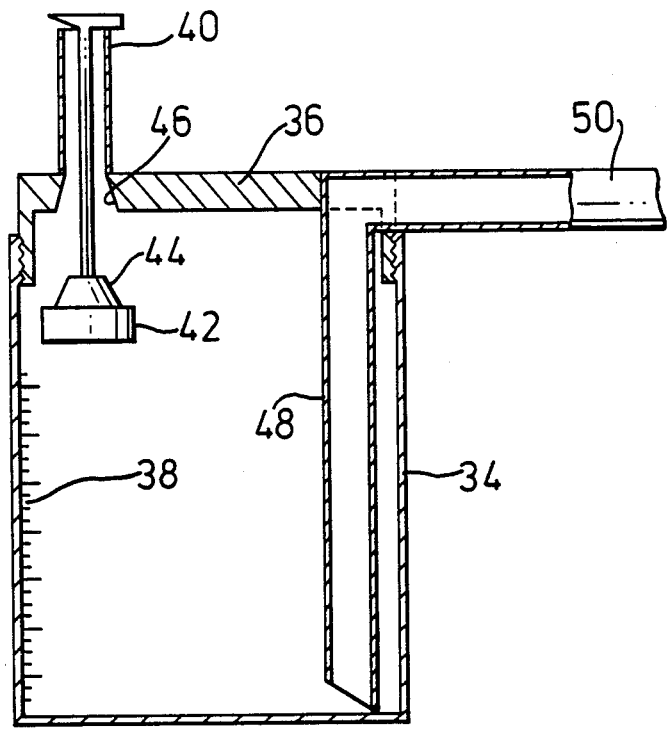
FIG. 2 is a sectional view of a calibration vessel of the apparatus shown in FIG. 1.

The calibration vessel 32 is shown in more detail in FIG. 2. It has a main body 34 provided with a cap 36. The main body 34 is made from a transparent material (or at least a part of it is transparent) and provided with graduations 38. The cap includes a venting arrangement 40 operated by a float 42. The float includes a valve member 44 which can cooperate with a valve seat 46 in the cap 36. The cap also has a dip tube 48 which extends to the bottom of the body 34 and is connected by a tube 50 to the diverter valve 30.

The apparatus which is diagrammatically shown in FIG. 1 is mounted so as to be mobile. For example, it may be mounted on a chassis provided with wheels so that it can be trailed behind a vehicle or pushed or pulled by a walking operator. Alternatively, the apparatus may be mounted on a framework provided with a hitch for connection to the three-point lift of a tractor.

In normal operation, the apparatus is controlled from the remote control 24 which will be positioned near the operator. The operator will key into the remote control device 24 the width of the boom 2 (for example, in meters) and the application rate for the herbicide (or other product) in the container 8 (for example in liters per hectare). This information will pass to the control unit 22, which will also receive signals from the travel speed sensor 26. As the apparatus moves over the ground, the sensor 26 will generate signals corresponding to the forward travel speed of the apparatus, and these signals will be passed to the control unit 22. The control unit 22 will transmit signals to the pump 18 to cause the pump 18 to operate at a speed corresponding to a volumetric output of the herbicide which corresponds to the desired application rate.

The control unit 22 also transmits a speed-related signal to the variable restrictor 28. The flow rate of water from the tank 10 to the spraying boom is thus adjusted in accordance with the travel speed. For example, at normal speeds, slight variations in the travel speed will affect the output of the pump 18, but will not effect the output of the pump 12. Thus, the flow of water to the boom 2 will remain the same, but the concentration of herbicide in the mixture will vary so that the area density of herbicide applied to the ground will remain substantially the same. However, if the speed of travel varies significantly, the concentration of herbicide in the mixture issuing from these spraying nozzles 4 may reach undesirable levels and so, under these circumstances, the control unit 22 will cause adjustment of the variable restrictor 28 to adjust the flow of water to the boom 2.

Owing to manufacturing tolerances, individual pumps 18 will not all deliver the same volumetric output at the same speed. Furthermore, as the pump 18 wears, its output/speed characteristic will vary. In addition, different compositions of herbicide in the container 8 will have different flow characteristics, and these, again, will vary the output/speed characteristic of the pump 18. In view of these factors, it is important to ensure that the flow rate of herbicide delivered by the pump 18 corresponds, as closely as possible, to the desired flow rate in any particular circumstances. It is therefore necessary to calibrate the pump 18 not only when it is first used, but also throughout its life and when the nature of the product in the container 8 is changed.

This is done with the aid of the calibration vessel 32. The valve 30 is positioned so as to direct the output of the pump 18 into the calibration vessel 32 through the dip tube 48. The control unit 22 has a "prime" operating key which, when depressed, will cause herbicide from the container 8 to be fed into the tube 50 and the dip tube 48 until it reaches the bottom of the calibration vessel 32. The control unit 22 also has a "test" operating key which, when operated, causes the control unit 22 to supply, to the pump 18, a signal corresponding to the actual travel speed as detected by the sensor 26, the pre-set boom length and the desired area density distribution for the herbicide. The boom length and the area density can be adjusted, if desired, at the control device 22. During a test cycle, the pump 12 is not operated. During a test, the apparatus is moved over the ground for a predetermined distance, such as 20 meters, during which the herbicide from the container 8 is fed to the calibration vessel 32, and the level of herbicide in the vessel 32 thus rises. Air in the calibration vessel is exhausted through the venting assembly 40.

In abnormal circumstances, the herbicide may flow sufficiently quickly for it to reach the lowermost position of the float 42 during the test, in which case the float will rise until, eventually, the valve 44 makes contact with the seat 46, to close the venting assembly 40. This will prevent the herbicide from being discharged from the vessel 32.

When the "test" cycle is complete, the operator can determine the position, along the graduations 38, which the surface of the herbicide has reached in the vessel 32. This provides a reading of the volume of herbicide which has been delivered by the pump 18 during the test. Because the spraying width can be determined from the boom length, it is possible to determine by calculation exactly how much herbicide should be delivered over the predetermined travel distance to give the required area density. Information derived from such calculations may be presented in the form of a graph or table. The actual volume reading can thus be compared with the desired volume, obtained from the calibration graph or table, and the operator can establish whether the output of the pump 18 is approximately correct, or is too high or too low. If the output is too high or too low, the operator can key a correction factor into the control unit 22, in order to step up or step down the speed of the pump 18. The calibration test can then be repeated to check that the correction factor has had the desired effect. Further correction and testing can be carried out as necessary until the output of the pump 18 is satisfactory. After each test, the pump 18 can be reversed, in order to return the herbicide in the vessel 32 to the container 8. This can be done, for example, by moving the apparatus backwards.

At the completion of testing, the diverter valve 30 can be returned to its normal position, in which the output of the pump 18 is passed to the line 20 and then to the line 14 to be mixed with water from the tank 10.

It will be appreciated that, in order to ensure that the flow rate from the pump 18 during testing provides an adequate indication of the flow rate from the pump 18 during normal operation, the resistance to flow into the calibration vessel 32 must be approximately the same as the resistance to flow into the line 14. Since a back-pressure in the line 20 will be generated by the operation of the pump 12 and by the resistances to flow in the contactor 16, the line 6 and the boom 2, some compensating backpressure must be established in the flow line to the calibration vessel 32. One way of achieving this is to pressurise the calibration vessel 32, possibly by means of a bleed from the pump 12, but a preferred method is to include a restrictor in the tube 50.

The calibration process can be checked by loading the container 8 with the same quantity of liquid as enters the calibration vessel 32 during a test, and then running the apparatus to discharge the liquid from the nozzles 34. The container 8 should empty over exactly the same distance as during the calibration test. If this does not happen, appropriate adjustment can be made to, for example, the restrictor in the tube 50.

In order to avoid, as far as possible, any danger of the operator coming into contact with the herbicide (or other product) in the container 8, the container 8 is preferably in the form of a sealed collapsible bag, as is disclosed in GB No. 2136321.

Figure 3:
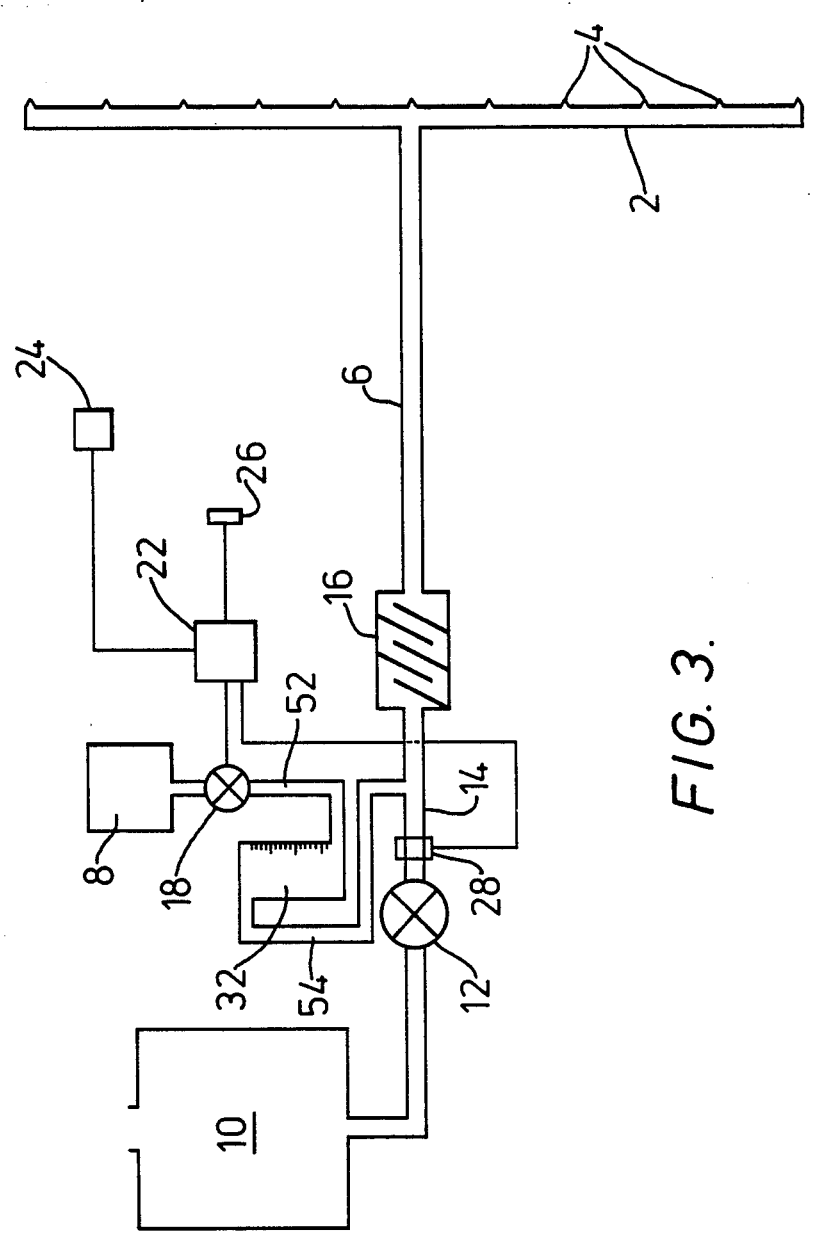
FIG. 3 corresponds to FIG. 1 but shows an alternative embodiment.

The embodiment shown FIG. 3 is similar, in many respects, to that shown in FIG. 1, and the same reference numbers are used to designate the same components. The difference between the two embodiments resides in the manner in which the calibration vessel 32 is connected between the pump 18 and line 14.

In FIG. 3, the pump 18 discharges into a line 52, which opens into the lower region of the calibration vessel 32. A further duct 54 connects the upper region of the calibration vessel 32 to the line 14. The calibration vessel may be similar to that shown in FIG. 2 (with the tube 50 corresponding to the duct 52), although the duct 54 would be connected to the vessel at its upper region, for example, at the cap 36.

In normal operation of the apparatus shown in FIG. 3, liquid supplied from the source 8 by the pump 18 flows through the calibration vessel 32 to the line 14, where it is mixed with water from the tank 10. The mixture then flows through the contactor 16 to the spray nozzles 4.

Calibration of the flow of liquid from the pump 18 to the line 14 would normally take place before use of the equipment, when the calibration vessel 32 is empty. If not, the calibration vessel 32 can be emptied by running the pump 18 in reverse. Then, with the pump 12 turned off, the pump 18 is operated in the forward direction until the level of liquid in the calibration vessel 32 reaches a "0" mark, and subsequently the apparatus is moved over a predetermined distance, after which the apparatus is stopped and the level of liquid in the calibration vessel 32 is determined, in order to provide an indication of the flow rate of liquid from the pump 18.

As an alternative to operating the pump 18 over a predetermined travel distance of the apparatus during a test cycle, the pump 18 could be operated for a predetermined time, for example 1 minute, at a rate corresponding to a commonly used travel speed, after which the level in the calibration vessel 32 could be determined to provide an indication of the volume of herbicide dispensed per unit area. Alternatively, the pump 18 could be operated until a predetermined volume of liquid has reached the calibration vessel 32, the flow rate then being determined on the basis of the time taken.

If the volume reading obtained from the calibration vessel 32 is acceptably close to the desired value, then the pump 12 may be started, and the apparatus can be used to deliver the liquid/water mixture without further ado. However, if the test cycle reveals that the output of the pump 18 is outside acceptable limits, then the calibration vessel 32 can be emptied by operating the pump 18 in reverse (for example by moving the apparatus backwards) until the level in the calibration vessel 32 returns to "0" mark. Appropriate adjustment can then be made to the control unit 22, and the test can be repeated as many times as is necessary to obtain an acceptable flow rate from the pump 18.

As with the apparatus of FIG. 1, measures may be taken to ensure that the resistance to flow into the calibration vessel 32 during a test cycle is comparable to that occurring during normal operation of the apparatus.

In the embodiments of FIGS. 1 and 3, the apparatus comprises a single calibration vessel 32 which is used to monitor the flow rate of herbicides to all of the spray nozzles of the boom 2. As an alternative, it would be possible to have several calibration vessels 32, each serving one spray nozzle 4, or a group of spray nozzles 4. This arrangement makes it possible to monitor the flow rates of herbicide to different nozzles 4, or groups of nozzles, so as to ensure that all of the spray nozzles 4 are delivering approximately the same strength of mixture.

I claim:

1. Apparatus for delivering a liquid, the apparatus being adapted for travel over a surface to which the liquid is to be delivered, the apparatus comprising a source of liquid, a variable output reversible pump, delivery means to which the liquid is supplied by the pump from the source, control means for adjusting the output of the pump, and a travel speed sensor for transmitting a travel speed signal to the control means, a duct being provided for directing liquid from the pump to the lower region of a calibration vessel for determining the volumetric output of the pump, reversal of the pump causing liquid to be returned from the calibration vessel to the source.

2. Apparatus as claimed in claim 1, in which the liquid is mixed with a second liquid at a region between the calibration vessel and the delivery means.

3. Apparatus as claimed in claim 2, in which the second liquid is fed to the delivery means from a second source by a second pump.

4. Apparatus as claimed in claim 3, in which a variable restrictor is provided at the delivery side of the second pump.

5. Apparatus as claimed in claim 4, in which the variable restrictor is controlled by the control means.

6. Apparatus as claimed in claim 1, in which a diverter valve is provided for connecting the pump selectively to the calibration vessel or the delivery means.

7. Apparatus as claimed in claim 6, in which means is provided for equalising the back-pressure, applied at the diverter valve, from the delivery means and from the calibration vessel.

8. A method of calibrating apparatus for delivering a liquid, the method comprising directing a regulated flow of the liquid from a reversible pump to a calibration vessel for a predetermined time, determining the volume of liquid supplied to the calibration vessel during the predetermined time, comparing that volume of liquid with the volume of liquid corresponding to a desired flow rate, and adjusting the flow rate of liquid, if necessary, in order to approximate the actual volume of liquid received in the calibration vessel with the volume corresponding to the desired flow rate, and subsequently reversing the pump to draw the liquid from the calibration vessel.

9. A method of calibrating apparatus for delivering a liquid, the apparatus being adapted for travel over a surface to which the liquid is to be delivered and including a reversible pump the output of which is controlled in response to the travel speed of the apparatus, the method comprising directing flow from the pump to a calibration vessel while the apparatus travels over a predetermined distance, determining the volume of liquid supplied to the calibration vessel during such travel, comparing the volume of liquid with the volume of liquid corresponding to a desired flow rate, adjusting the control of the pump, if necessary, in order to approximate the actual volume of liquid with the volume corresponding to the derived flow rate, and subsequently reversing the pump to draw the liquid from the calibration vessel.

10. A method as claimed in claim 9, in which the pump is reversed by causing the apparatus to travel backwards.

* * * * *